May 8, 1962 A. W. HOLLAR ETAL 3,033,510
VEHICLE SEAT ADJUSTER
Filed Sept. 8, 1959 2 Sheets-Sheet 1
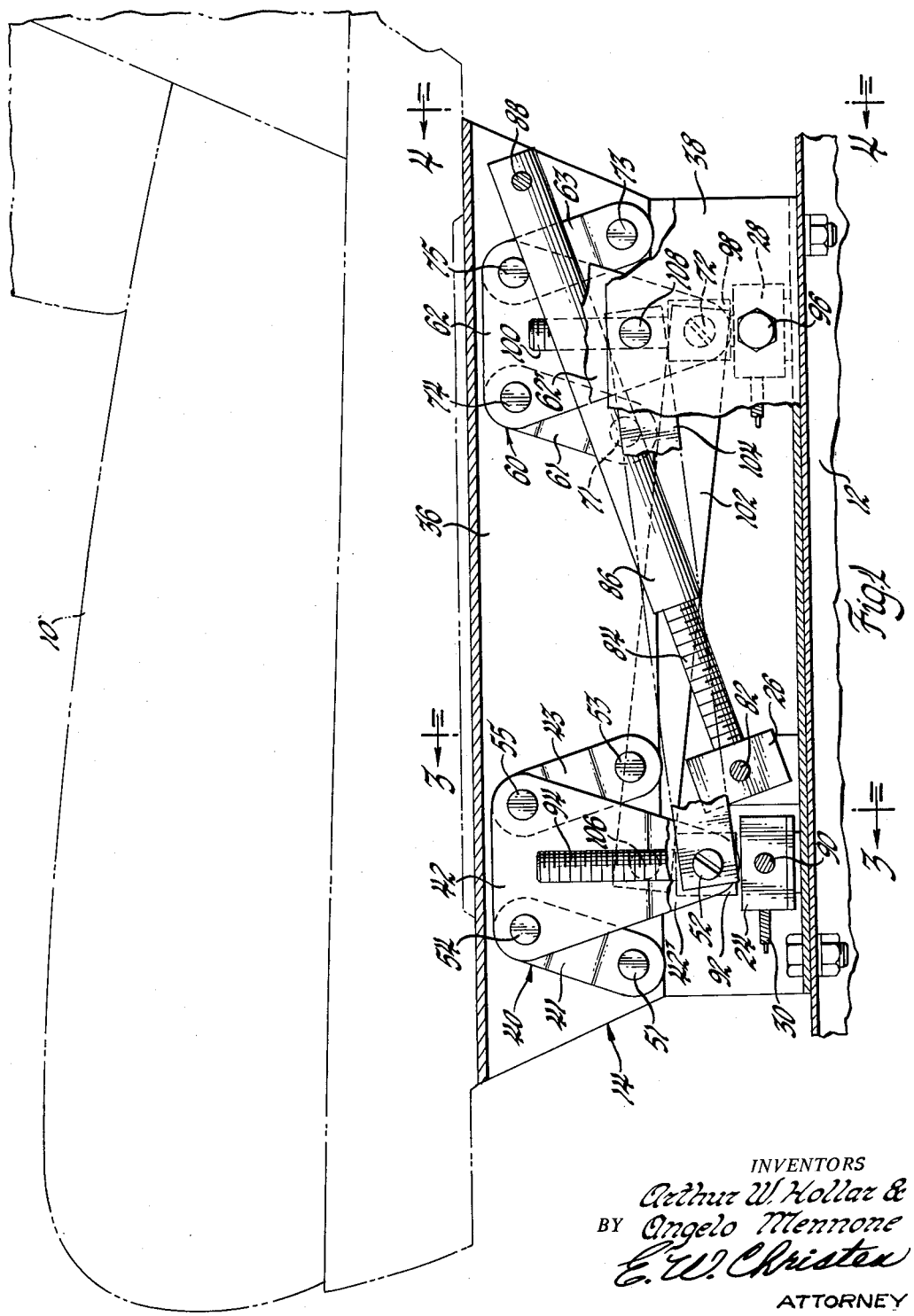
INVENTORS
Arthur W. Hollar &
BY Angelo Mennone
E. W. Christen
ATTORNEY

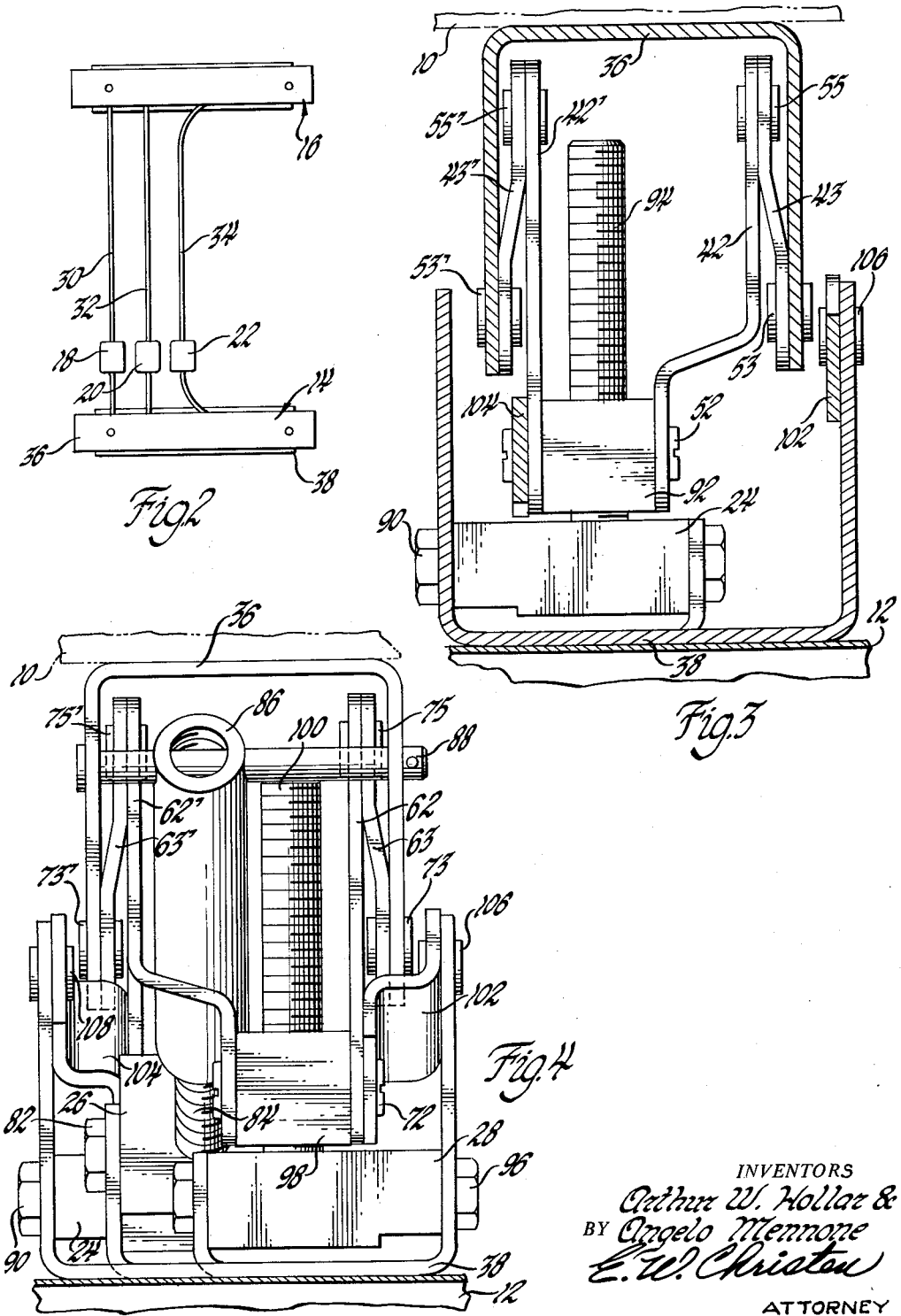

United States Patent Office 3,033,510
Patented May 8, 1962

3,033,510
VEHICLE SEAT ADJUSTER
Arthur W. Hollar, Grosse Pointe, and Angelo Mennone, Detroit, Mich., assignors to General Motors Corporation, Detroit, Mich., a corporation of Delaware
Filed Sept. 8, 1959, Ser. No. 838,728
7 Claims. (Cl. 248—394)

This invention relates to a mechanism for providing substantially straight line movement and, more particularly, to a vehicle seat adjuster which incorporates such mechanism.

An object of the invention is to provide a pair of members with relative movement along a substantially straight path by an interconnecting linkage mechanism. A further object of the invention is to provide the seat and floor members of a vehicle seat adjuster with a linkage mechanism that will give fore and aft movement to the seat member along a substantially straight path and with actuating structure to effect such movement and to selectively elevate portions of the linkage mechanism to give the seat member up and down and tilting movement.

In the drawings:

FIGURE 1 is a side elevation, partially broken away, of a vehicle seat adjuster in accordance with the invention;

FIGURE 2 is a plan view of the seat adjuster;

FIGURE 3 is a section taken on the plane indicated by the line 3—3 of FIGURE 1, and FIGURE 4 is a section taken on the plane indicated by the line 4—4 of FIGURE 1.

Referring to the drawings, a front seat 10 is supported on the vehicle floor 12 by a pair of similar seat adjusters 14 and 16 which are located at the left and right sides of the seat. Individually operable and reversible electric motors 18, 20 and 22 power screw jack actuators 24, 26 and 28 for each of the adjusters 14 and 16 by flexible shafts 30, 32 and 34.

The adjusters 14 and 16 are similar and operate in unison so only the the adjuster 14 need be described. Many of the individual links on the left side of the adjuster 14 are paired with similar links on the right side of the adjuster so for convenience the reference characters of the lefthand links and pivots of such pairs will be given a prime designation.

The adjuster 14 includes an upper channel member 36 that is secured to the underside of the seat 10 and a lower channel member 38 that is secured to the floor 12. The invention is particularly concerned with the linkage arrangement that provides the upper member 36 with movement along a substantially straight path in fore and aft direction so that linkage will be described first and, as an aid in ready understanding, the jacks 24 and 28 should first be considered as stationary elements of the lower member 38.

The aforesaid linkage arrangement comprises a linkage set 40 having links 41, 42 and 43 with a first pivot 51 from the first link 41 to the upper member 36, a second pivot 52 from the second link 42 to the up and down actuating element of the lower member 38, a third pivot 53 from the third link 43 to the upper member 36, a fourth pivot 54 from the first link 41 to the second link 42 and a fifth pivot 55 from the third link 43 to the second link 42. The linkage arrangement further comprises another and similar linkage set 60 having links 61, 62 and 63 with a pivot 71 from the link 61 to the upper member 36, a pivot 72 from the link 62 to the up and down actuating element of the lower member 38, a pivot 73 from the link 63 to the upper member 36, a pivot 74 from the link 61 to the link 62 and a pivot 75 from the link 63 to the link 62.

The upper member 36 is thus swingably supported on the pivots 52 and 72 by the linkage sets 40 and 60 for movement in fore and aft direction and this movement is along a substantially straight path as opposed to the decidedly arcuate path that would result if the upper member were supported on the pivots by a single pair of parallel links in the conventional fashion. The pivots 51 and 53 are arranged so that a line drawn through them will be parallel to, or in alignment with, a line drawn through the pivots 71 and 73 and the movement path of the upper member 36 is along such lines. The pivots 51, 52 and 53 are located below the pivots 54 and 55 in the linkage set 40 and the pivots 71, 72 and 73 are located below the pivots 74 and 75 in the linkage set 60. In the linkage set 40 there is a greater ristance between the pivots 51 and 53 than between the pivots 54 and 55 and there are equal distances between the pivots 51 and 54 and the pivots 53 and 55 and a like distance situation prevails in the linkage set 60. The pivots 52 and 72 of the linkage sets 40 and 60 may be below the pivots 51, 53 and 71, 73 as shown, or may be above them or in alignment with them. True straight line movement is obtained when the pivots 52 and 72 are in alignment with the pivots 51, 53 and 71, 73 and a slight departure therefrom is obtained as the pivots 52 and 72 are moved out of alignment, as shown, but this is not objectionable for the seat only needs to follow a substantially straight path.

The screw jack 26 includes a drive housing which is pivoted to the lower member 38 at 82 and a rotatable screw 84 which is powered in either direction by the motor 20 and an actuating element 86 which is threaded on the screw shaft 84 and pivoted to the upper member 36 at 88. The upper member 36 is thus shifted in fore and aft direction by the actuating element 86 on rotation of the screw shaft 84 along the substantially straight path provided by the linkage sets 40 and 60.

The front screw jack 24 has a housing pivoted at 90 on the lower member 38 and has an actuating nut element 92 threaded on a screw shaft 94, while the rear screw jack 28 has a housing pivoted on the lower member 38 at 96 and an actuating nut element 98 threaded on a screw shaft 100. The pivots 72 and 52 of the linkage sets connect to the actuating nut elements 98 and 92 and also connect to respective stabilizing links 102 and 104 which have pivot connections to the lower member 38 at 106 and 108. The motors 18 and 22 can be operated together to raise the actuating elements 92 and 98 and thus elevate both ends of the seat or they may be operated individually to raise one of the actuating elements and thus elevate one end of the seat to tilt the same. The motor 20 may be operated with the motors 18 and 22 or singly to move the seat in fore and aft direction. If the pivot 52 is elevated while the pivot 72 is kept stationary, the screw jack 24 will swing about the pivot connection 90 with a slight amount of travel which is afforded by the stabilizing link 104. If the pivot 72 is elevated while the pivot 52 is kept stationary, the screw jack 28 will swing about the pivot connection 96 with a slight amount of travel which is afforded by the stabilizing link 102.

It is to be understood that, although the invention has been described with specific reference to a particular embodiment thereof, it is not to be so limited since changes and alterations therein may be made which are within the full intended scope of this invention as defined by the appended claims.

We claim:

1. In a vehicle having spaced seat adjuster units supporting a vehicle seat for fore and aft adjustment along a substantially straight path, said path being defined by substantially equal fore and aft movement from a central position; each adjuster unit comprising a seat supporting channel having a web portion secured to said seat and parallel side portions downwardly extending from each side of the web portion, a floor channel having a web portion secured to the vehicle floor and parallel side portions extending upwardly from each side of the web portion, said seat channel and said floor channel having different widths and the side portions of one extending within the side portions of the other, a pair of linkage sets spaced along said path and movably supporting said seat channel relative to said floor channel, said linkage sets being supported by one of said web portions and located between the side portions of said seat channel and between the side portions of said floor channel, and each of said linkage sets being movable equal distances fore and aft of said central position to move said seat channel in a substantially straight line along said path.

2. The apparatus as defined in claim 1 and wherein each of said linkage sets comprises a bell crank, a first lever pivotally connected at one end to said bell crank and pivotally connected at the other end to means supported by one of said channels, a second lever pivotally connected at one end to said bell crank and pivotally connected at the other end to said one of said channels, said bell crank being pivotally connected to the other of said channels and the pivotal connection therebetween being located between said first lever and said second lever at said central position, the link-bell crank pivotal connections between said first lever and said bell crank and between said second lever and said bell crank being substantially equally spaced from said path in said central position so that a line drawn through the link-bell crank pivotal connections is substantially parallel to said path in said central position, the link-bell crank pivotal connections being equally vertically spaced from the link-one channel pivotal connections between said first lever and said one of said channels and between said second lever and said one of said channels in said central position so that a line drawn through the link-one channel pivotal connections is substantially parallel to said path, and one of said link-bell crank pivotal connections being movable from said central position during relative forward movement of said seat to a position of substantial alignment with said lever-one channel pivotal connections and the other of said link-bell crank pivotal connections being movable from said central position during relative rearward movement of said seat to a position of substantial alignment with said lever-one channel pivotal connections whereby said channels are relatively movable equal distances in a substantially straight path fore and aft of said central position.

3. The apparatus as defined in claim 2 and wherein each adjuster unit further comprises a vertical jack screw centrally located at each linkage set, an adjusting nut rotatably mounted on said jack screw and being movable relative thereto, power means to drive said nut upwardly and downwardly on said jack screw, said pivotal connection between said bell crank and said other channel member being formed by a pivotal connection between said bell crank and said nut whereby said seat channel may be vertically adjusted by movement of said nut on said jack screw.

4. A vehicle seat adjuster having a pair of upper and lower members adapted for securement to the seat and floor of the vehicle, a pair of linkage sets for providing the members with relative movement along a substantially straight path in fore and aft direction and spaced along the path, the lower member including three individually movable actuating elements, two elements being movable in up and down direction and the third element being movable in fore and aft direction, each linkage set having first, second and third links and first, second, third, fourth and fifth pivots with the first pivot from the first link to the upper member, the second pivot from the second link to a respective one of the up and down actuating elements of the lower member, the third pivot from the third link to the upper member, the fourth pivot from the first link to the second link and the fifth pivot from the third link to the second link, each linkage set also having the first and third pivots in alignment with the path and the first, second and third pivots located to one side of a line drawn through the fourth and fifth pivots, each linkage set further having a greater distance between the first and third pivots than between the fourth and fifth pivots and equal distances between the first and fourth pivots and third and fifth pivots, and means for connecting the fore and aft element to the upper member.

5. Apparatus in accordance with claim 4 wherein three jacks provide the lower member with the three actuating elements.

6. A mechanism for providing a pair of members with relative movement along a substantially straight path comprising a pair of linkage sets spaced along said path and movably supporting one of said members relative to the other of said members, said path being defined by substantially equal fore and aft movement from a central position, each of said linkage sets comprising a bell crank having three pivotal connections, one of said pivotal connections being located midway along said path at said central position and connecting said bell crank to means supported by one of said members, the other two pivotal connections of said bell crank being located on opposite sides of said one pivotal connection along a line parallel to said path at said central position, a link member located on each side of said one pivotal connection and each link member being pivotally connected to said bell crank at one of said other two pivotal connections, each link member being additionally pivotally connected to the other of said members at spaced points located on opposite sides of said one pivotal connection along a line parallel to said path at said central position, and said one pivotal connection and said spaced points being relatively movable parallel to said path and said other two pivotal connections being movable along arcs defined by pivotal movement of each link member to permit movement of said one pivotal connection in a straight line fore and aft of said central position.

7. A mechanism for providing a pair of members with relative movement along a substantially straight path comprising a pair of linkage sets spaced along said path and movably supporting one of said members relative to the other of said members, said path being defined by substantially equal fore and aft movement from a central position located midway along said path, each linkage set comprising a bell crank, a first lever pivotally connected at one end to said bell crank and pivotally connected at the other end to means supported by one of said members, a second lever pivotally connected at one end to said bell crank and pivotally connected at the other end to said one of said members, said bell crank being pivotally connected to the other of said members and the pivotal connection therebetween being located between said first lever and said second lever at said central position, the link-bell crank pivotal connections between said first lever and said bell crank and between said second lever and said bell crank being substantially equally spaced from said path in said central position so that a line drawn through the link-bell crank pivotal connections is substantially parallel to said path in said central position, the link-bell crank pivotal connections being equally vertically spaced from the link-one member pivotal connections between said first lever and said one of said members and between said second lever and said one of said members in said central position so that a line drawn through the link-one member pivotal connections is substantially parallel to said path, and one of said link-bell crank pivotal connections being movable from said central position during relative forward movement of said members to a position of substantial alignment with said lever-one member pivotal connections and the other of said link-bell crank pivotal connections being movable from said central position during relative rearward movement of said members to a position of substantial alignment with said lever-one member pivotal connections whereby said members are relatively movable equal distances in a substantially straight path fore and aft of said central position.

References Cited in the file of this patent

UNITED STATES PATENTS

| | | |
|---|---|---|
| 2,256,004 | Thomas | Sept. 16, 1941 |
| 2,921,621 | Williams | Jan. 19, 1960 |
| 2,942,647 | Pickles | June 28, 1960 |